F. A. SCHULZ.
CLAMP.
APPLICATION FILED MAR. 20, 1911.
1,042,610.
Patented Oct. 29, 1912.
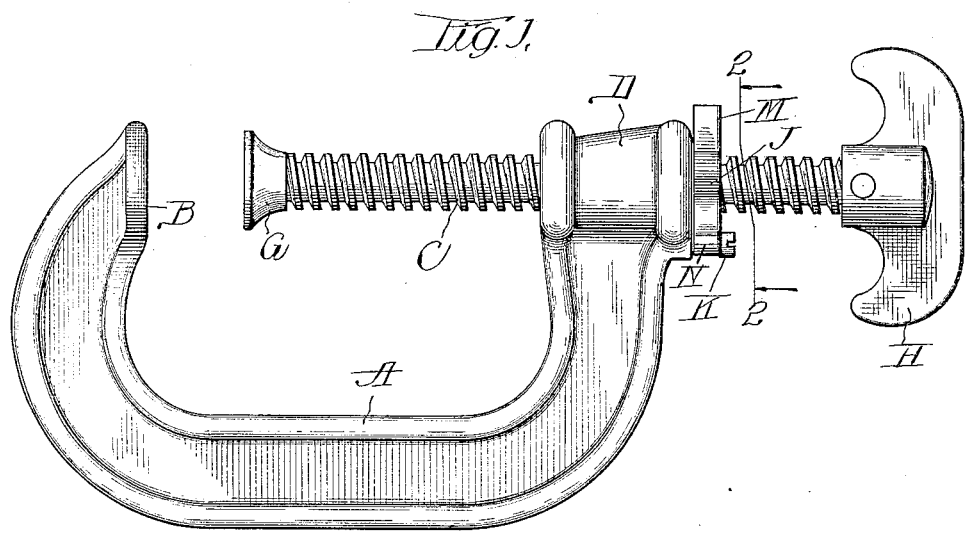
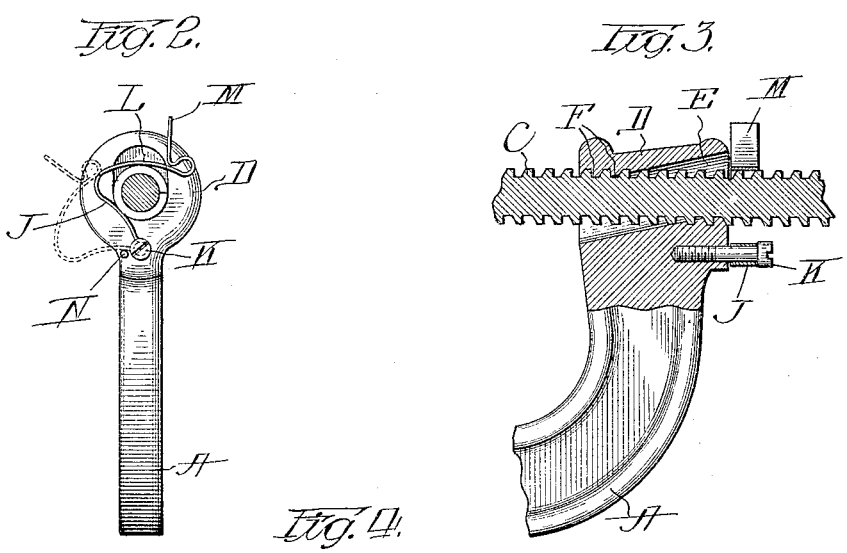

UNITED STATES PATENT OFFICE.

FRITZ A. SCHULZ, OF CHICAGO, ILLINOIS.

CLAMP.

1,042,610. Specification of Letters Patent. Patented Oct. 29, 1912.

Application filed March 20, 1911. Serial No. 615,764.

*To all whom it may concern:*

Be it known that I, FRITZ A. SCHULZ, citizen of the United States, residing at Chicago, in the county of Cook and State of Illinois, have invented certain new and useful Improvements in Clamps; and I do hereby declare the following to be a full, clear, and exact description of the invention, such as will enable others skilled in the art to which it appertains to make and use the same.

This invention relates to a novel construction in a clamp for use by machinists, cabinet-makers and the like, the object being to provide a rapidly adjustable device of this character, and consists in the features of construction and combinations of parts hereinafter fully described and claimed.

In the accompanying drawings illustrating the invention: Figure —1— is a view in side elevation of a clamp constructed in accordance with my invention. Fig. —2— is a plan view of the same, the screw shaft thereof being shown in section on the line 2—2 of Fig. —1—. Fig. —3— is a fragmentary detail central vertical longitudinal section of the same. Fig. —4— is a fragmentary detail view similar to Fig. —3—, the screw shaft being shown therein in dotted lines in released position and the means for holding the screw shaft in engagement with the threads being omitted from illustration.

In clamps of the character shown, and which will be described hereinafter, it is desirable that the screw shaft carrying one of the jaws shall be readily and quickly adjusted to a position to permit the work to be inserted and placing the jaws approximately in position so that a single turn or two of the screw shaft will serve to engage the work therein.

The object of the present invention is to provide a clamp in which the screw shaft is quickly adjustable relatively to the frame of the clamp.

A further object of the invention is to provide means manually operated in one direction for maintaining the screw shaft in engagement with the threads of the carrying member after the same has been approximately adjusted to the requisite position and which is automatically operated by the screw shaft in the other direction to permit the latter to be released from engagement with said threads when it is desired to release the work and adjust the screw shaft to a different position.

The frame A of the clamp is of the usual shape resembling that of the letter C, the same being provided at one end with a jaw B which is opposed to the lower end of the screw shaft C, the latter passing through an opening E in a sleeve D disposed upon the other end of said member A and preferably cast integral therewith. The said opening E is enlarged at opposite end portions and at diametrically opposite sides so that at its ends said opening appears to be elliptical. The method employed in forming said opening E is to first bore a hole of requisite diameter and thread the same to fit and receive the screw shaft C. Then a second hole, slightly greater in diameter than the greatest diameter of the shaft C and adapted to permit free longitudinal movement of the latter therein, is bored on an axis extending angularly to the axis of the threaded hole and intersecting the latter midway between the ends of the first hole bored. In effect the second boring operation serves only to cut away the threads of the first hole at opposite sides and ends thereof. Thus only those threads F disposed beyond the sphere of operation of the second drill are left at opposite sides and ends of the said opening E whereby a relative pivotal movement of the shaft C and sleeve D on a horizontal axis intersecting the axes of the two borings at the intersection of the latter with each other is permitted thereby throwing the threads of the shaft C into or out of engagement with the threads F according to the direction of relative pivotal movement of said shaft and sleeve D. The said shaft C is equipped at the end thereof opposing the jaw B with a foot-piece G rotatably mounted thereon in the usual manner, said shaft C being rotated by means of the thumb piece H mounted upon the other end thereof.

It will be noted that, in order to permit the free longitudinal movement of the shaft C relatively to the member A, it is necessary to turn said shaft on the aforesaid axis as a pivot in a direction to throw the foot-piece G thereon toward the middle portion of the member A. When said shaft is in this position, as indicated in Fig. —4—, it may be moved longitudinally with perfect freedom to any desired position and by then merely turning it back to the position shown in Figs. —1— and —3— it will again become engaged with the threads F so that further longitudinal movement of said shaft relatively to the member A must be accomplished by relative rotation of said members. In engaging an object between the jaw B and foot-piece G it is possible that the said screw shaft C may spring out of engagement with the threads F upon applying considerable force to the rotation thereof. To prevent this I provide a latch member J which consists of a piece of flat spring metal which is substantially U-shaped and is pivotally secured at the free end of one of its arms to the projection K on the upper end of said sleeve D, said projection K consisting preferably of a screw. The arm L of said member J is curved concentric with the pivot of said member J or substantially so and on a radius slightly less than the distance between the axis of said projection K and the farthest removed point in the periphery of the shaft C when the latter is engaged with the threads F. On the free end portion of the arm L of said member is a projection M adapted to be engaged by the thumb of the operator to throw said projection primarily into engagement with said shaft C when it is desired to lock the latter in the position shown in Fig. —1—. The said arm L of said member J is thus frictionally engaged with the ridges of the threads of the shaft C with a yielding pressure so that, as soon as the free end portion of said arm L engages said screw shaft, rotation of the latter to the right, in the direction to throw the foot-piece G toward the jaw B, will serve to throw said arm over to the right until the middle portion of the other arm of said member J lies in contact with the periphery of said screw shaft. The latter may then be further rotated to the right without imparting further movement to said member J. Upon reversing the direction of rotation of the screw shaft C relatively to the member A the said arm L will be moved by the screw-shaft in the reverse direction so as to automatically release the same from engagement with said screw shaft thereby permitting the latter to be thrown over to the position to release the same from engagement with the threads F and permitting it to be freely moved longitudinally relatively to the member A.

In order to prevent the said member J from turning back a distance greater than is essential to its release from engagement with the screw shaft C and to permit the latter to be thrown to the position shown in Fig. —4— I provide a stop N adjacent the projection K which is adapted to limit the pivotal movement of said member J in one direction.

It will be understood, of course, that the said member J is made of a relatively heavy and stiff spring steel so that it may successfully resist the tendency of the shaft C to spring out of engagement with the threads F. The threads of the screw-shaft are provided with bearing faces which are preferably disposed at right angles to the axis of rotation of the shaft while the lower faces thereof are inclined, the threads F being similarly formed so that said threads are adapted to resist the tendency of the screw-shaft C to spring to the position shown in Fig. 4.

My said invention is extremely simple and efficient besides being durable and very rapidly operable.

I claim as my invention:

1. In a clamp of the class described, the combination with a member carrying the rigid jaw, a screw-shaft carrying the movable jaw, and means permitting the engagement and disengagement of said screw-shaft with said member comprising threads disposed at opposite sides and ends of the wall of an opening in said member through which said screw-shaft passes and in which it is adapted to be rocked on an axis perpendicular to its longitudinal axis to throw its threads into and out of engagement with said threads of said opening, of a manually operable member pivotally mounted on the rigid member contiguous to a threaded side of the opening and adapted to engage said screw-shaft at a point diametrically opposite said threaded side to maintain the same in engagement with the latter.

2. In a clamp of the class described, the combination with a member carrying the rigid jaw, a screw-shaft carrying the movable jaw, and means permitting the engagement and disengagement of said screw-shaft with said member comprising threads disposed at opposite sides and ends of the wall of an opening in said member through which said screw-shaft passes and in which it is adapted to be rocked on an axis perpendicular to its longitudinal axis to throw its threads into and out of engagement with said threads of said opening, of a manually operable member pivotally mounted on the rigid member contiguous to a threaded side of the opening and adapted to frictionally engage said screw-shaft at a point diametrically opposite said threaded side to maintain the same in engagement with the latter, said shaft adapted when turned in a direction to advance the jaws toward each other to maintain said manually operable member in engagement therewith, and adapted when turned in the reverse direction to release said member from engagement therewith.

3. In a clamp of the class described, the combination with a member carrying the rigid jaw, a screw-shaft carrying the movable jaw, and means permitting engaging and disengaging said screw-shaft with said member comprising threads disposed at opposite sides and ends of the wall of an opening in said member through which said screw-shaft passes and in which it is adapted to be rocked on an axis perpendicular to its longitudinal axis to throw its threads into and out of engagement with said threads, of a substantially U-shaped member of spring metal pivotally secured at the free end of one arm to said first-named member adjacent the threaded portion of one end of the opening for the passage of said screw-shaft, the other arm thereof being curved on an arc having the said pivot as an axis, the radius of curvature being less than the distance from said pivot to the farthest radially removed point in the periphery of the screw-shaft, said arm being adapted to exert a yielding pressure on said screw-shaft to hold the same in engagement with said threads of said first-named member.

In testimony whereof I have signed my name in presence of two subscribing witnesses.

FRITZ A. SCHULZ.

Witnesses:
M. M. BOYLE,
H. L. HALE.

Copies of this patent may be obtained for five cents each, by addressing the "Commissioner of Patents, Washington, D. C."